B. G. BEALOR.
GLASS MANUFACTURE.
APPLICATION FILED JUNE 7, 1917.
1,331,796.
Patented Feb. 24, 1920.
3 SHEETS—SHEET 2.
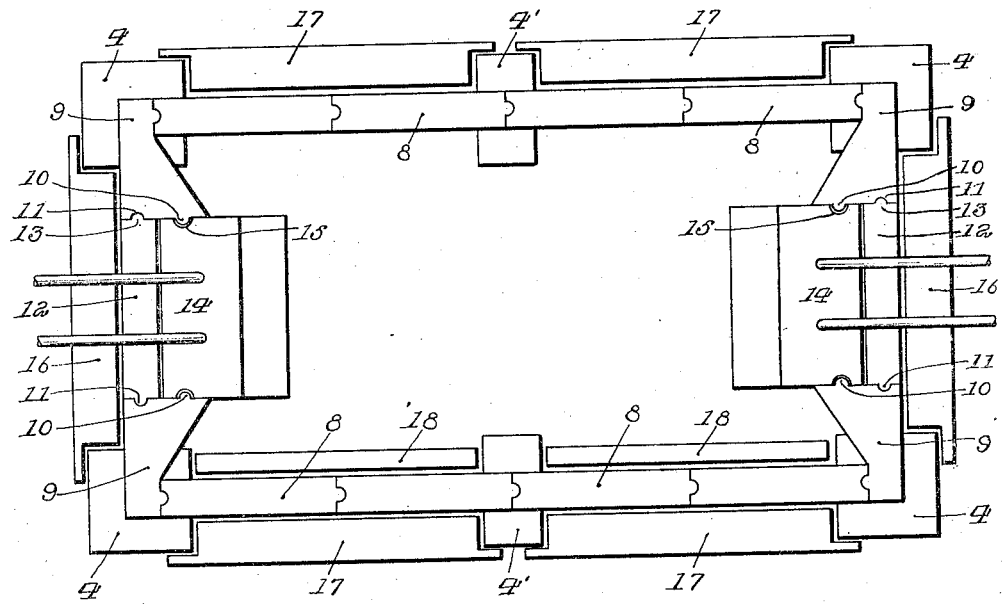
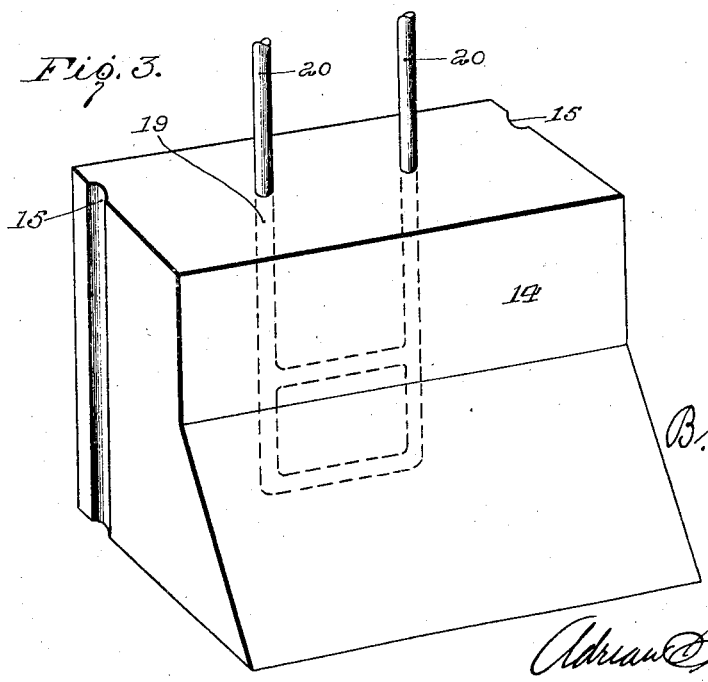
B. G. Bealor
Inventor
Adrian D_____
his Attorney B. G. BEALOR.
GLASS MANUFACTURE.
APPLICATION FILED JUNE 7, 1917.
1,331,796.
Patented Feb. 24, 1920.
3 SHEETS—SHEET 3.
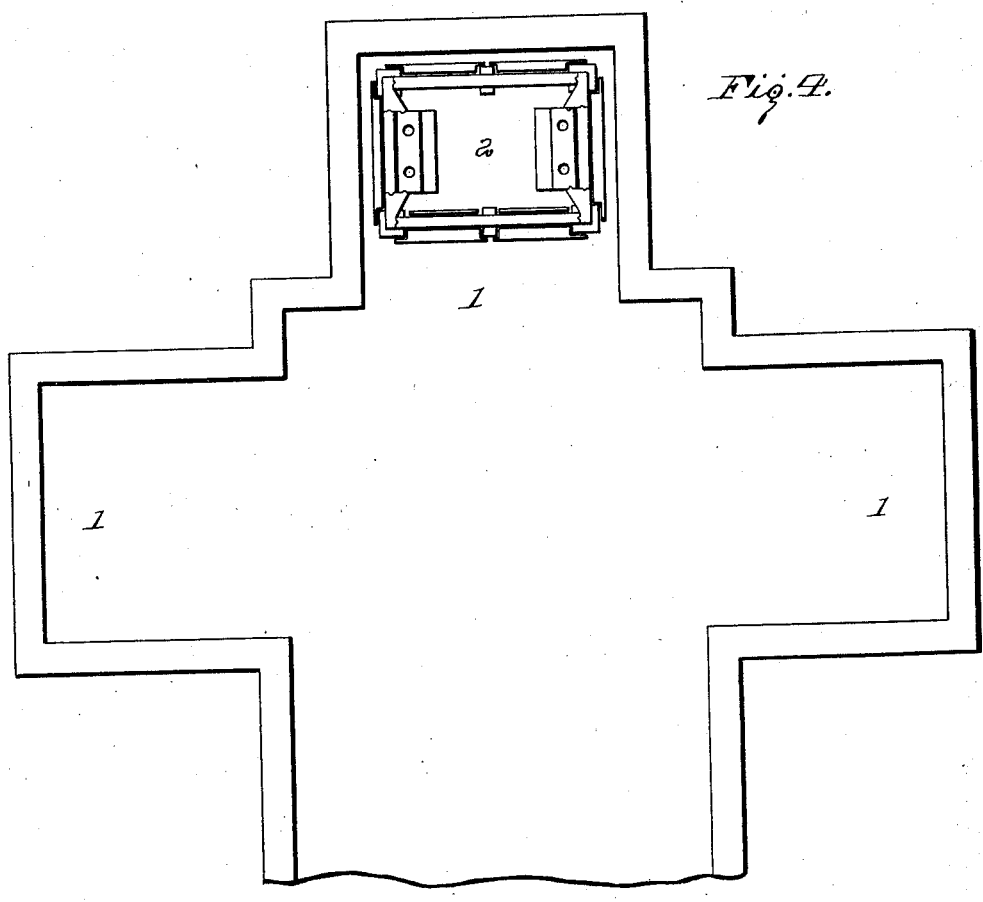
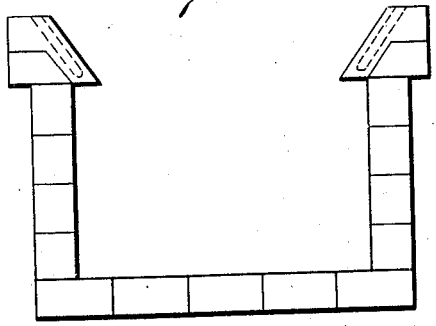
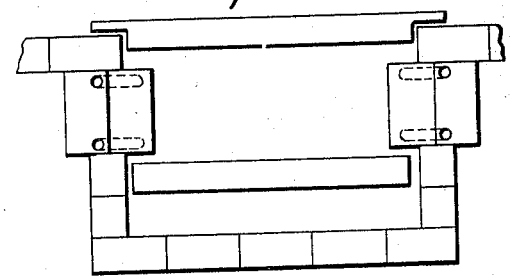
B. G. Bealor, Inventor
By Adrian B. Azer
his Attorney

UNITED STATES PATENT OFFICE.

BUDD G. BEALOR, OF ASPINWALL, PENNSYLVANIA.

GLASS MANUFACTURE.

1,331,796.    Specification of Letters Patent.    Patented Feb. 24, 1920.

Application filed June 7, 1917. Serial No. 173,273.

*To all whom it may concern:*

Be it known that I, BUDD G. BEALOR, a citizen of the United States, residing at Aspinwall, in the State of Pennsylvania, have invented certain new and useful Improvements in Glass Manufacture, of which the following is a specification.

This invention relates to an improvement in the art of manufacturing window glass, and more particularly to continuously drawing glass in sheet formation.

One of the difficulties experienced in drawing sheet glass has been the difficulty of maintaining the initial width of the sheet during the drawing operation, due to the difficulty of effectively controlling the consistency of the glass, and the proper cooling thereof during the act of severing the sheet edges from the mass of molten glass.

By the use of my improved apparatus these difficulties are effectively overcome, and I am able to draw glass of a pre-determined width and thickness in continuous lengths.

My invention further consists in the novel construction, arrangement and manipulation of the parts as will appear from the following description, in which reference will be had to the accompanying drawings, which show a form of apparatus embodying my said invention, wherein:

Fig. 2, is a plan view of the drawing well of the tank showing the various accessories thereto.

Fig. 3, is an enlarged perspective view of one of the sheet edge forming blocks.

Fig. 4, is a plan view with portions broken away of a glass tank showing a drawing well placed in one of the extensions thereof.

Fig. 5, represents in vertical section another modification of the drawing well.

Fig. 6, represents in plan view the modification shown in Fig. 5.

Figure 1:
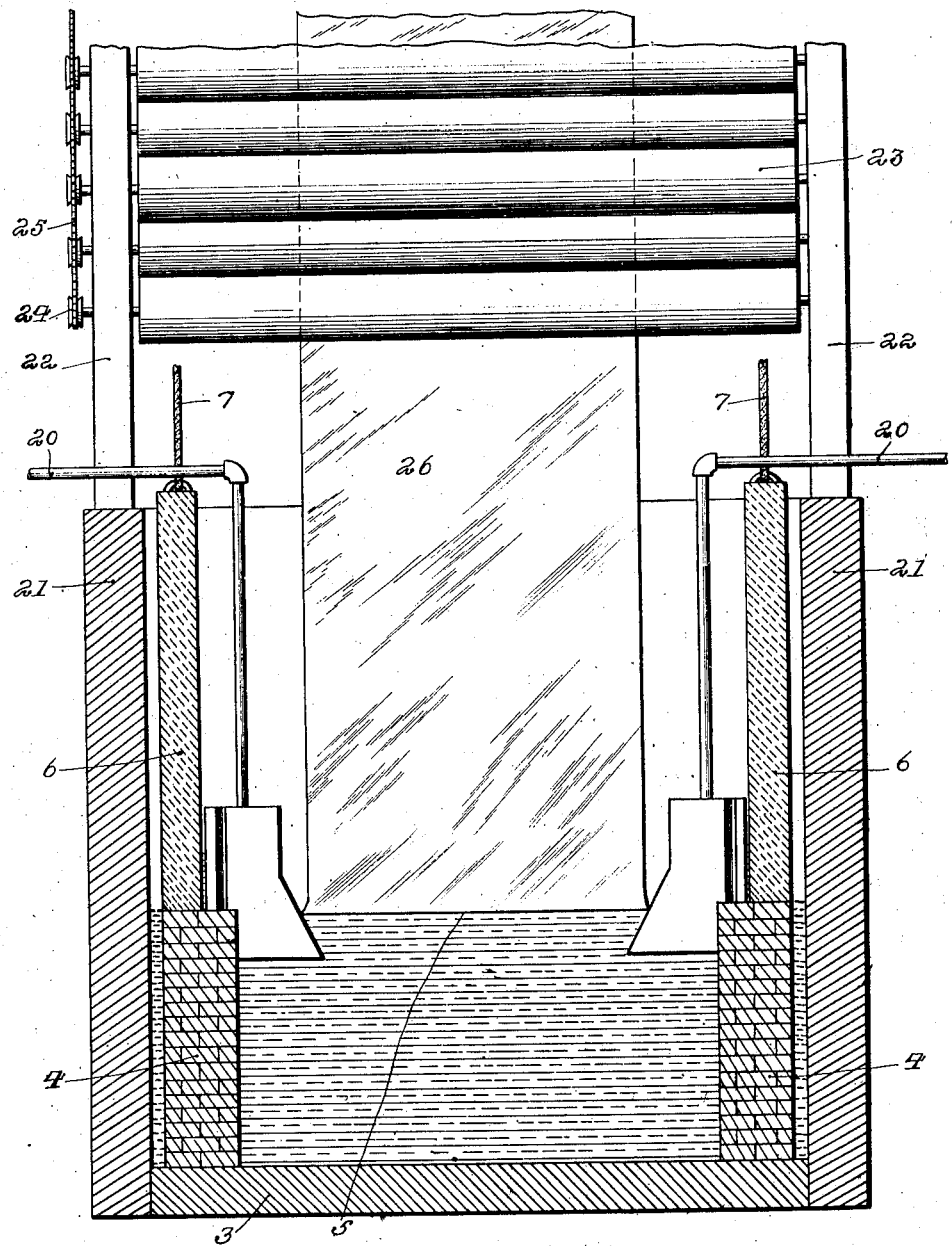
Figure 1, represents in central vertical section a portion of one form of glass tank embodying my present invention showing in connection therewith in elevation an apparatus in the act of drawing a sheet of glass from said tank.

The use of my improved apparatus may be adapted to any of the common forms of glass tanks now in use, and for the purpose of applying my device, the extension or drawing chamber 1, is constructed by building out from the main tank, side and end walls comprising what is commonly known in the art as a "dog-house". Located within the extension 1, is a drawing well 2, constructed by building upwardly from the bottom of the tank 3, piers 4 to a point approximately the height of the level of the glass line 5. At this point the piers are connected by horizontally disposed sills. At a point above the glass line 5, extending upwardly from the sills are the movable shades 6, which are adapted for vertical movement by suitable elevating means attached to the cables 7. These shades screen off the heat from the tank and may be elevated when it is desired to raise the temperature within the drawing well. Located intermediate of the piers 4, are piers 4'. Extending from the piers 4 to the piers 4', are sills 8. Located on each of the piers 4 is a specially designed block 9 of refractory material having on its inner face the projecting tongue 10, and the groove 11. Located between the blocks 9 is the end sill 12, provided with a tongue 13, adapted to register with and reside in the groove 11. Located inside of the end sills 12, and parallel thereto are a pair of vertically movable blocks 14, provided with grooves 15, adapted to register with the tongues 10, of the blocks 9. Located between the piers 4 and adapted to normally float in the molten glass, is the floater 16. Located between the piers 4 and 4', are similar floaters 17. Located between the piers 4 and 4', and normally residing inside the sills 8 are the floaters 18. These floaters provide for maintaining the surface of the glass inclosed therein free from surface impurities commonly present in glass tanks.

The floaters 18 are adapted to normally reside in the position shown in Fig. 2. Should however, the surface of the glass in the drawing well intermediate of the blocks 14, require skimming or through accident or otherwise a portion of the congealed sheet fall back into the drawing well, the floaters 18, may be moved across the sheet drawing zone by suitable manipulating means, thereby removing partially congealed glass or sheet residue from the drawing zone.

As shown in Fig. 3, the blocks 14, are provided with a conduit 19, cored therein, to which are connected suitable pipes 20, for the purposes of conveying a cooling fluid therethrough. By reference to Fig. 1, it will be observed that the block 14, normally rests with a portion thereof below the glass line level 5. The inner face of that portion of the block so disposed within the molten glass is skew faced or beveled. This block and its peculiar formation forms an important feature of this invention as will be more fully disclosed as the description proceeds Extending upwardly from the wall 21, are a pair of roller columns 22, comprising each a plurality of rollers 23, adapted for rotative movement. These roller columns are so located in adjacent relation to each other that by the rotative movement of the rollers, a sheet of glass drawn between the columns will by its contact with the revolving rollers in each column, be elevated by its contact therewith. The rotative movement may be conveyed to the rollers 23, in any suitable manner, and for the purpose of having the rollers in each column move in the same direction, I mount each roller on extended shafts in suitable bearings and place on each shaft extension, a suitable sprocket wheel 24, which are suitably connected to each other by the sprocket chain 25.

The sheet edge forming blocks 14, are placed in pairs in the drawing well, and are adapted to be raised and lowered independently as may be required. The immersion in the glass of a greater or lesser portion of the block 14, as well as the cooling fluid passing through the conduit 19, will vary the temperature of the molten glass from which the sheet edges are drawn, and the reduction in temperature may be intensified by increasing the flow of the cooling fluid passing through the conduit 19. By so reducing and thereby controlling the temperature, the consistency of the molten glass can be likewise controlled.

It has been characteristic in the results of the attempts heretofore made to draw sheet glass from the main body of molten glass, that the sheet had a tendency to narrow as the drawing operation proceeded. This effect occurs to the molten body at a point of greatest plasticity. By the use of my improved sheet edge forming block, I am able to impart to the glass at this point a reduction in plasticity effective only in that portion of the batch of glass from which the edges of the sheet are drawn. By the use of separate cooling mediums for each sheet edge producing portion of the glass, that portion of the molten glass intermediate of the edge producing portions remains at substantially the same temperature as the surrounding glass in the tank. By these means, I accomplish results heretofore unobtained where the sheet producing surface area of the molten glass was entirely surrounded by a cooling medium or forming receptacle. I further provide for drawing a sheet of glass from the surface of molten glass contained within a segregated area, without effecting the temperature by the segregating means thereby screening off all foreign particles flowing on the surface of the molten glass such as cinders, scales, etc.

In Fig. 1, I show a forming block adapted for vertical movement This is to enable me to cause an immersion thereof to a greater or lesser degree as may be found necessary in properly forming the sheet edge portions.

In Figs. 5 and 6, are shown modifications of the forming blocks, wherein the forming block is placed in a stationary position on the tank wall.

To start the initial drawing, a bait of the form well known in the art, is lowered by suitable means between the roller columns, and into the drawing well until it comes in contact with the molten glass therein. After immersion in the glass a suitable length of time, it is withdrawn to a point where the sheet of glass 26, depending therefrom, is passed upwardly between the roller columns, and receives elevating movement from the rollers 23, when the bait is severed by means well known in the art, and the movement of the rollers 23, will continue to draw a sheet of glass of indefinite length from the molten glass within the drawing well. The movement conveyed to the rollers 23 is of such a degree of speed that the glass forming the sheet 26 will have become fully congealed at the point where it comes in contact with the elevating means. The lesser degree of speed of the drawing, and the application of the cooling means of a greater degree to the glass, will increase the thickness of the sheet being drawn.

It is evident that many slight changes might be resorted to in the relative arrangement of the parts shown and described without departing from the spirit and scope of my invention hence I would have it understood that I do not wish to confine myself to the exact construction and arrangement of parts shown and described, but Having fully described my invention what I claim as new and desire to secure by Letters-Patent, is:—

1. In a glass drawing apparatus, a tank for containing molten glass, a plurality of refractory piers extending upwardly from the bottom of said tank, horizontally disposed sills resting on said piers above the level of said glass, a plurality of refractory shields located intermediate of said piers and normally floating in the glass positioned with their upper faces in a plane above the lower surface of said sills, a pair of vertically adjustable refractory blocks spaced apart and partially immersed in the molten glass in said tank intermediate of two of said piers, and means for drawing a sheet of glass from the molten glass intermediate of said blocks.

2. In a glass drawing apparatus, a tank for containing molten glass, a plurality of refractory piers extending upwardly from the bottom of said tank, horizontally disposed sills resting on said piers above the level of said glass, a plurality of refractory shields located intermediate of said piers and normally floating in the glass positioned with their upper faces in a plane above the lower surface of said sills, a pair of vertically adjustable refractory blocks spaced apart in said tank intermediate of two of said piers having their opposite faces inclined outwardly from a vertical line at the point of immersion in said molten glass, and means for drawing a sheet of glass from the molten glass intermediate of said blocks.

3. In a glass drawing apparatus, a tank for containing molten glass, a plurality of refractory piers extending upwardly from the bottom of said tank, horizontally disposed sills resting on said piers above the level of the glass, a plurality of refractory shields located intermediate of said piers and normally floating in the glass positioned with their upper faces in a plane above the lower surface of said sills, a pair of vertically adjustable refractory blocks spaced apart and partially immersed in the molten glass in said tank intermediate of two of said piers having their opposite faces inclined outwardly from a vertical line at the point of immersion in said glass, means for controlling the temperature of the inclined faces of said refractory blocks, and means for drawing a sheet of glass from the molten mass intermediate of said blocks.

4. In a glass drawing apparatus, a tank for containing molten glass, a plurality of refractory piers extending upwardly from the bottom of said tank, horizontally disposed sills resting on said piers above the level of said glass, a plurality of refractory shields located intermediate of said piers and normally floating in the glass positioned with their upper faces in a plane above the lower surface of said sills, a pair of vertically adjustable refractory blocks spaced apart in said tank intermediate of two of said piers having their opposite faces inclined outwardly from the vertical line at the point of immersion in said molten glass, fluid cooled conduits located in said blocks extending downwardly to a point below the glass line level and in parallel relation to the inclined faces of said blocks and means for drawing a sheet of glass from the molten glass intermediate of said blocks.

5. An apparatus of the character described, comprising a tank for containing molten glass, a glass drawing well formed of refractory shields located within said tank, a pair of vertically movable refractory blocks spaced apart in said well, provided with fluid conduits cored therein whose opposite faces are progressively distanced at the glass line as the blocks are increasingly immersed in the molten glass, and means for drawing a sheet of glass from the molten mass intermediate of said blocks in a plane at right angles to said faces.

6. An apparatus of the character described, comprising a tank for containing molten glass, a plurality of refractory piers surrounded by said glass, a plurality of refractory sills connecting said piers forming a rectangular inclosure, vertically movable shades adapted to normally rest on said sills, vertically movable refractory blocks spaced apart within the rectangular inclosure partially immersed in the molten glass, means for reducing the temperature of the glass at the point of contact with said blocks, and means for drawing a sheet of glass from the molten glass intermediate of said blocks by forming the sheet edges of the molten glass in contact with said blocks.

In testimony whereof I have affixed my signature in the presence of two witnesses.

BUDD G. BEALOR.

Witnesses:
   H. N. CORBETT,
   A. A. GLOTZLACH.